United States Patent
Jäermyr et al.

(10) Patent No.: US 8,396,206 B2
(45) Date of Patent: *Mar. 12, 2013

(54) MULTI-CHANNEL COMMUNICATION DEVICE AND METHODS FOR REDUCING ECHOES BY INSERTING A TRAINING SEQUENCE UNDER A SPECTRAL MASK

(75) Inventors: Simon Jäermyr, Skarpnaeck (SE); Mikael Hjelm, Vaesteras (SE)

(73) Assignee: Infineon Technologies AG, Neubiberg (DE)

( * ) Notice: Subject to any disclaimer, the term of this patent is extended or adjusted under 35 U.S.C. 154(b) by 1727 days.

This patent is subject to a terminal disclaimer.

(21) Appl. No.: 11/675,405

(22) Filed: Feb. 15, 2007

(65) Prior Publication Data

US 2008/0198779 A1    Aug. 21, 2008

(51) Int. Cl.
*H04M 9/08*    (2006.01)
(52) U.S. Cl. ........... 379/406.1; 379/406.13; 379/406.14; 370/288; 370/292; 348/614
(58) Field of Classification Search . 379/406.01–406.16
See application file for complete search history.

(56) References Cited

U.S. PATENT DOCUMENTS

| | | | |
|---|---|---|---|
| 4,987,569 A * | 1/1991 | Ling et al. | 370/292 |
| 5,164,989 A | 11/1992 | Brandman et al. | |
| 5,283,784 A * | 2/1994 | Genter | 370/288 |
| 5,400,394 A | 3/1995 | Raman et al. | |
| 6,738,480 B1 * | 5/2004 | Berthault et al. | 381/66 |
| 6,766,019 B1 * | 7/2004 | Benesty et al. | 379/406.01 |
| 6,947,553 B2 | 9/2005 | Koyama et al. | |
| 7,062,039 B1 * | 6/2006 | Rasmusson | 379/406.1 |
| 2002/0090079 A1 | 7/2002 | Stephens et al. | |
| 2003/0223574 A1 * | 12/2003 | Schulz | 379/406.01 |
| 2006/0062166 A1 | 3/2006 | Jones et al. | |
| 2008/0198778 A1 | 8/2008 | Hjelm | |

* cited by examiner

*Primary Examiner* — Yuwen Pan
*Assistant Examiner* — Ibraham Sharifzada
(74) *Attorney, Agent, or Firm* — SpryIP, LLC (57) ABSTRACT

Embodiments of a multi-channel audio communication device and methods for reducing echoes are generally described herein. Other embodiments may be described and claimed. In some embodiments, echo-reduction circuitry may insert training signals into digital audio signals at or below a noise floor and in a non-audible portion of the frequency spectrum based on a spectral mask. Training signals may be generated from spectrum estimates and training sequences. An adaptive filter may generate echo-cancellation signals using filter coefficients generated fawn the training sequences and return-path signals. The echo cancellation signals may remove echo signals from the return-path signals.

19 Claims, 4 Drawing Sheets

MULTI-CHANNEL COMMUNICATION DEVICE AND METHODS FOR REDUCING ECHOES BY INSERTING A TRAINING SEQUENCE UNDER A SPECTRAL MASK

TECHNICAL FIELD

The present invention pertains to electronic communications. Some embodiments pertain to echo-cancellation in fit duplex audio communication systems.

BACKGROUND

In many modern full-duplex audio communication systems, echo cancellers are generally employed to eliminate acoustic feedback introduced in the speaker. By simulating the acoustic echo path, the echo signal may be subtracted from the signal on the return path. The difficulties of acoustic echo cancellation are mainly due to the high computational complexity of the echo canceller and influences which disturb the adaptation of the canceller, such as ambient noise, near end speech, and variations of the acoustic environment. Echoes are particularly difficult to cancel in many modern digital voice communication systems due to the increased latency introduced by packetization and/or compression techniques. For example, in many modern digital audio communication systems when both persons are talking at the same time, it may be difficult for an echo cancellation algorithm to converge fast enough to suppress the echo. Furthermore, in many modern digital audio communication systems when the echo environment changes, the echo cancellation algorithm may fail to converge sometimes causing an even worse echo.

Thus, there are general needs for audio communication devices and methods for reducing echoes in modern digital voice communication systems. There are also general needs for audio communication devices and methods for reducing echoes in modern digital voice communication systems capable of reducing echoes regardless of the acoustic environment.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
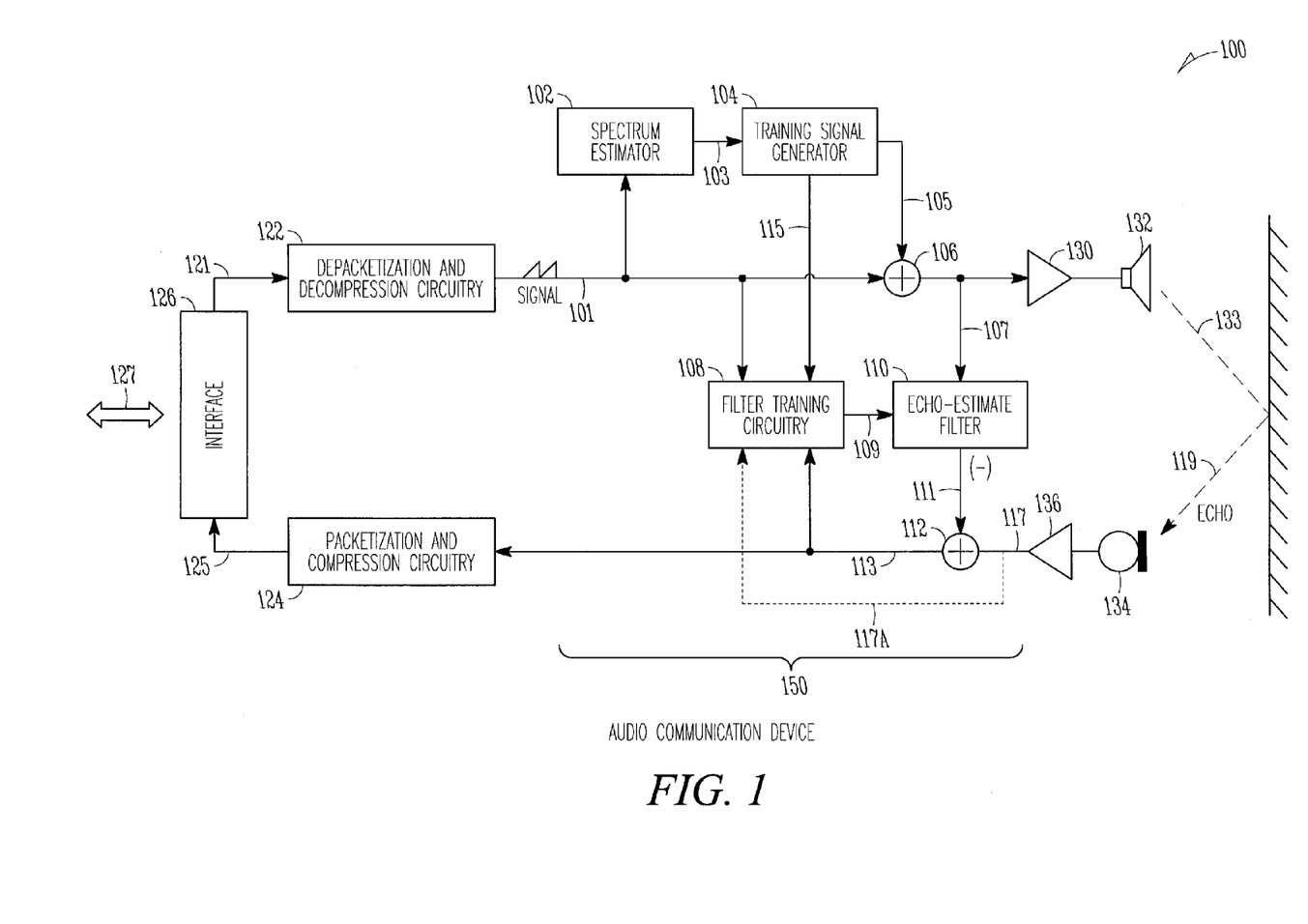
FIG. 1 is a functional block diagram of a full-duplex audio communication device in accordance with some embodiments of the present invention.

FIG. 1 is a functional block diagram of a full-duplex audio communication device in accordance with some embodiments of the present invention. Full-duplex audio communication device 100 may be any audio communication device such as digital telephone, a wireless or wireline handset, a cellular or mobile telephone, a speaker phone, a cordless telephone, etc., that provides full-duplex audio communications.

Full-duplex audio communication device 100 may include network interface 126 to transmit and receive packetized communication signals 127 with a communication network. Full-duplex audio communication device 100 may also include depacketization and decompression circuitry 122 to depacketize and decompress packetized communication signals 121 received from interface 126, and digital-to-analog conversion (DAC) and audio amplification circuitry 130 to generate audio signals 133 with speaker 132. Full-duplex audio communication device 100 may also include microphone 134 and audio amplification and analog-to-digital conversion (ADC) circuitry 136 to provide return-path signals 117 and echo-reduction circuitry 150 to reduce echoes in return-path signals 117. Full-duplex audio communication device 100 may also include packetization and compression circuitry 124 to compress and packetize echo-removed signals 113 and provide packetized communication signals 125 to interface 126 for subsequent transmission. In some embodiments, interface 126 may provide an interface with an internet-protocol (IP) network, such as the internet, although the scope of the invention is not limited in this respect.

In some embodiments, packetization and compression circuitry 124 may compress and/or format digital audio information in accordance with a standard audio compression format, such as the MPEG layer 3 (MP3) format, although the scope of the invention is not limited in this respect as other audio compression formats may also be suitable. Similarly, depacketization and decompression circuitry 122 may decompress and/or de-format digital audio information received from interface 126 in accordance with a standard audio compression format.

In accordance with some embodiments of the present invention, echo-reduction circuitry 150 may generate training signals 105 for insertion into digital audio signals 101 at or below a noise floor. Training signals 105 may be generated from spectrum estimate 103 and a training sequence. Echo-reduction circuitry 150 may also generate echo-cancellation signal 111 for use in removing echo signals 119 from return-path signals 117.

In some embodiments, echo-reduction circuitry 150 may include training signal generator 104 to generate training signals 105 for insertion into digital audio signals 101, filter training circuitry 108 to estimate filter coefficients 109 from the training sequence and return-path signals 117, and echo-estimate filter 110 to generate echo-cancellation signal 111. In these embodiments, through the use of a training sequence inserted into digital audio signals 101, echo signals 119 may be cancelled without having to evaluate an actual echo. One advantage is that the training sequence may allow the echo to be removed even when one or more users are speaking, which is difficult for many conventional echo-reduction systems.

In some embodiments, echo-reduction circuitry 150 may also include spectral estimator 102 to generate spectrum estimate 103 from digital audio signals 101. In these embodiments, training signal generator 105 may generate a spectral mask from spectrum estimate 103 and may filter the training sequence based on the spectral mask to generate training signals 105. In these embodiments, training signal generator 105 may filter the training sequence so that each frequency component of the training sequence fits under the spectral mask. These embodiments are discussed in more detail below.

In some embodiments, echo-reduction circuitry 150 may also include first summer 106 to combine training signals 105 with digital audio signals 101 to provide modified digital audio signals 107, and second summer 112 to subtract echo-cancellation signal 111 from ret-path signals 117 to provide echo-removed signal 113.

Although echo-reduction circuitry 150 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein some embodiments, the functional elements of echo reduction circuitry 150 may refer to one or more processes operating on one or more processing elements.

Figure 2:
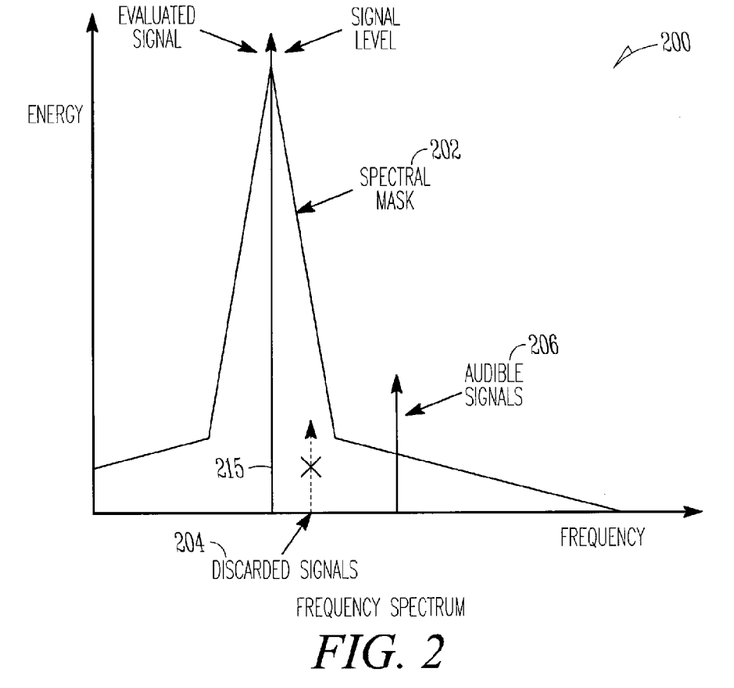
FIG. 2 illustrates a spectral mask and a frequency spectrum in accordance with some embodiments of the present invention.

FIG. 2 illustrates a spectral mask and a frequency spectrum in accordance with some embodiments of the present invention. As illustrated in FIG. 2, spectral mask 202 may have a frequency response to exclude at least some non-audible portions of frequency spectrum 200 to allow training signals 105 (FIG. 1) to be inserted into digital audio signals 101 (FIG. 1) at or below the noise floor within the non-audible portions of the frequency spectrum. Spectral mask 202 may be generated by training signal generator 104 (FIG. 1) based on spectrum estimate 103 (FIG. 1). In these embodiments, training signals 105 (FIG. 1) may be further configured to subtract out the non-audible portions (e.g., discarded signals 204) below spectral mask 202. In these embodiments, training signal generator 104 (FIG. 1) may determine where to inert the training sequence in the audio signal, and may be configured to remove the non-audible portions below spectral mask 202. In this way, noise in the non-audible portion of frequency spectrum 200 may be reduced allowing the training sequence to be inserted. Accordingly, each tone 215 of the training sequence may be provided at an elevated energy level. Audible signals 206 may be outside the frequency range of spectral mask. These embodiments are discussed in more detail below.

Referring back to FIG. 1, in some embodiments, training signal generator 104 may perform a discrete Fourier transform (DFT), such as a Fast Fourier Transform (FFT), on the training sequence to provide frequency components of the training sequence, and may scale the frequency components of the training sequence based on the spectral mask. In these embodiments, training signal generator 104 may also remove non-audible portions of the spectrum in the frequency domain. In these embodiments, training signal generator 104 may also perform an inverse DFT, such as an IFFT, on the scaled frequency components of the training sequence and the removed non-audible portions of signals from the spectrum to generate training signals 105. In these embodiments, training signal generator 104 may remove non-audible portions of the spectrum in the frequency domain prior to the IFFT.

Accordingly, training signals 105, when combined with digital audio signals 101 by summer 106, may reduce and/or remove the non-audible portions while inserting the training sequence in the non-audible portions. The majority of the energy of the training sequence may reside in the nor-audible portions of the spectrum and little or no energy may reside at or below a noise floor of the audible portions of the frequency spectrum. In this way users of audio communication device 100 may be unable to detect the presence of training signals 105.

In some embodiments, spectrum estimator 102 may generate spectrum estimate 103 from digital audio signals 101 by sampling digital audio signals 101 and performing a DFT, such as an FFT, on the sampled digital audio signals to provide estimates for each of a plurality of discrete frequency bins. In these embodiments, training signal generator 104 may use the estimates for each of the discrete frequency bins to generate spectral mask 202. In these embodiments, spectral mask 202 may separate and/or divide the audible from the non-audible portions of the frequency spectrum. Training signal generator 104 may use the estimates for each of the discrete frequency bins to remove the non-audible portions from spectrum estimate 103.

Each set of samples of digital audio signals 101 may have a unique frequency spectrum. In these embodiments, spectrum estimator 102 may generate/update spectrum estimate 103 regularly, and test signal generator 104 may revise spectrum mask 202 (FIG. 2) based on the updated spectrum estimate, although the scope of the invention is not limited in this respect. In some embodiments, digital audio signals 101 may comprise 8-bit digital signals, while in other embodiments, digital audio signals 101 may comprise 16-bit digital signals, although the scope of the invention is not limited in this respect.

In some embodiments, filter training circuitry 108 may estimate filter coefficients 109 by performing a cross-correlation with the training sequence and return-path signals 117 to generate echo-filter taps based on an amplitude and a location of a correlation peak. Echo estimate filter 110 may adaptively apply the echo-filter taps to the modified digital audio signals 107 to generate the echo-cancellation signal 111. In these embodiments, the echo-filter taps may correspond to filter coefficients 109.

In some embodiments, filter training circuitry 108 may perform a cross-correlation using return-path signals 117 after subtraction of echo-cancellation signal 111. Filter training circuitry 108 may perform the cross-correlation using echo-removed signal 113. In some alternate embodiments, filter training circuitry 108 may perform a cross-correlation using return-path signals 117 prior to subtraction of echo-cancellation signal 111. In these alternate embodiments, filter training circuitry 108 may perform the cross-correlation using return-path signals 117A rather than using echo-removed signal 113.

In some embodiments, filter training circuitry 108 may estimate filter coefficients 109 using the training sequence provided by training signal generator 104 using signal path 115. In some embodiments, filter training circuitry 108 may also benefit firm receiving digital audio signals 101 and using statistics thereof when generating filter coefficients 109. In some alternate embodiments, filter training circuitry 108 may estimate filter coefficients 109 using the training sequence present within training signals 105 provided by training signal generator 104. In these alternate embodiments, rather than estimating filter coefficients 109 using the training sequence directly provided by training signal generator 104, filter training circuitry 108 may estimate filter coefficients 109 using training signals 105.

In some embodiments, the training sequence may be a maximum-length (ML) pseudo-random noise (PN) sequence, although the scope of the invention is not limited in this respect as other types of sequences may also be suitable. In some embodiments, the training sequence may have one or more autocorrelation properties. In these embodiments, a correlation may produce a peak for time-delayed versions of the sequence with little or no correlation results otherwise.

Figure 3:
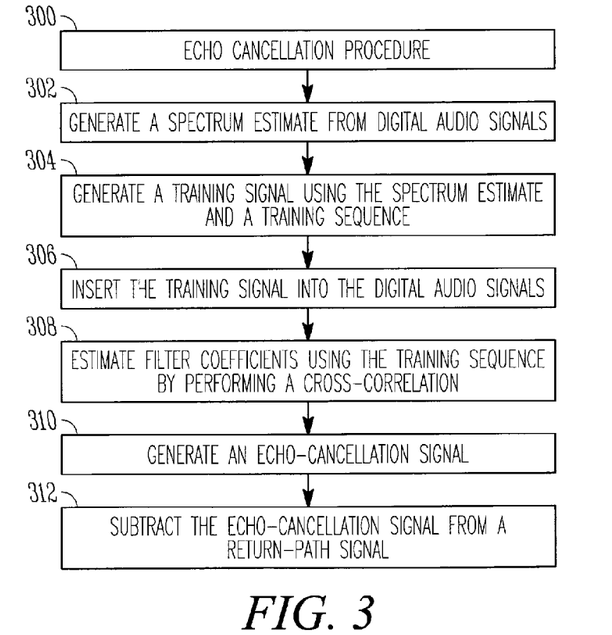
FIG. 3 is a flow chart of an echo cancellation procedure in accordance with some embodiments of the present invention.

FIG. 3 is a flow chart of an echo cancellation procedure in accordance with some embodiments of the present invention. Echo cancellation procedure 300 may be performed by echo-reduction circuitry, such as echo-reduction circuitry 150 (FIG. 1), although other circuitry may be configured to perform procedure 300.

Operation 302 comprises generating a spectrum estimate from digital audio signals. In some embodiments, operation 302 may be performed by spectrum estimator 102 (FIG. 1).

Operation 304 comprises generating a training signal using the spectrum estimate and a training sequence. In some embodiments, operation 304 may be performed by training signal generator 104 (FIG. 1). The training sequence may be configured to include the training sequence at or below the noise floor and/or in a non-audible portion of the spectrum. The training sequence may also be configured to reduce noise in the non-audible portion of the spectrum.

Operation 306 comprises in the training signal into the digital audio signals. In some embodiments, operation 306 may be performed by summer 106 (FIG. 1).

Operation 308 comprises estimating filter coefficients using the training sequence by performing a cross-correlation. In some embodiments, the training sequence may be cross-correlated with return-path signals to identify a correlation peak for use in estimating filter coefficients. In some embodiments, operation 308 may be performed by filter training circuitry 108 (FIG. 1).

Operation 310 comprises generating an echo cancellation signal. In some embodiments, the echo cancellation signal may be generated by echo-estimate filter 107 (FIG. 1) based on the filter coefficients generated in operation 308 and the summed signals generated in operation 306.

Operation 312 comprises subtracting the echo-cancellation signal from a return-path signal. In some embodiments, operation 312 may be performed by summer 112 (FIG. 1).

The operations of procedure 300 may be performed on a regular basis to continually reduce echoes as the acoustic environment changes. Although the individual operations of procedure 300 are illustrated and described as separate operations, one or more of the individual operations may be performed concurrently, and nothing requires that the operations be performed in the order illustrated.

Figure 4:
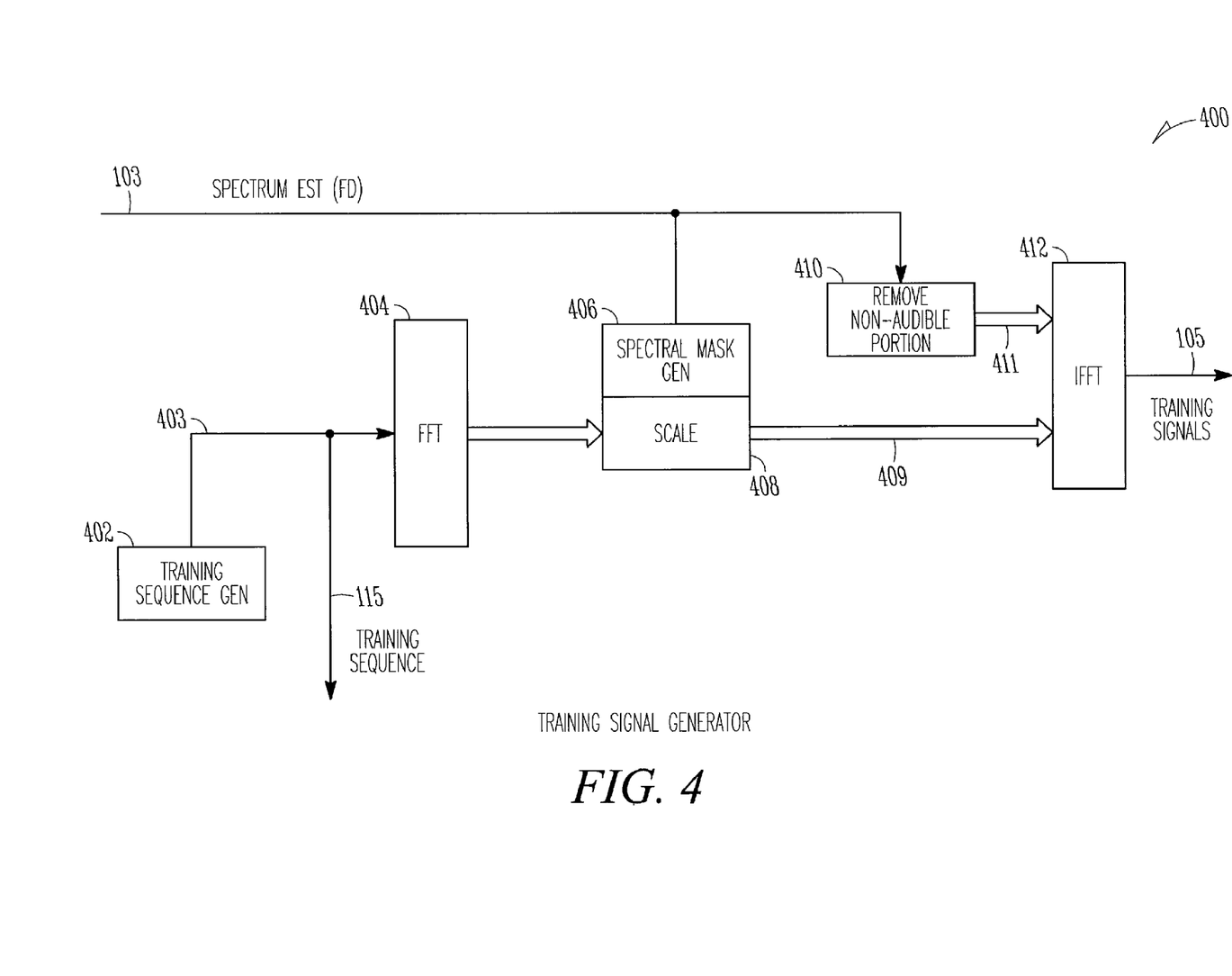
FIG. 4 is a functional block diagram of a training signal generator in accordance with some embodiments of the present invention.

FIG. 4 is a functional block diagram of a training signal generator in accordance with some embodiments of the present invention. Training signal generator 400 may be suitable for use as training signal generator 104 (FIG. 1), although other configurations may also be suitable. Training signal generator 400 may include training sequence generator 402 to generate training sequence 403. Training signal generator 400 may also include FFT circuitry 404 to perform a DFT, such as an FFT, on training sequence 403 to provide frequency components of the training sequence. In some alternate embodiments, training sequence 403 may be stored in memory and provided to FFT circuitry 404.

Training signal generator 400 may also include spectral mask generation circuitry 406 to generate a spectral mask, such as spectral mask 202 (FIG. 2), based on spectrum estimate 103, which may be provided in the frequency domain (FD). Training signal generator 400 may also include circuitry 408 to scale the frequency components of the training sequence based on the spectral mask so that the frequency components of the training sequence fit under spectral mask. Training signal generator 400 may also include circuitry 410 to remove non-audible portions of the spectrum. Training signal generator 400 may also include IFFT circuitry 412 to perform an inverse DFT, such as an IFFT, on the scaled frequency components of training sequence 409 and the removed non-audible portions 411 of signals of the spectrum to generate training signals 105.

In some embodiments, spectral mask generator 406 may use the estimates for each of the discrete frequency bins that may be provided in spectrum estimate 103 to generate the spectral mask. Circuitry 410 also may use the estimates for each of the discrete frequency bins that may be provided in spectrum estimate 103 to remove the non-audible portions from the spectrum, although the scope of the invention is not limited in this respect. In some embodiments, training sequence 403 may be provided to filter training circuitry 108 (FIG. 1) over signal path 115 as illustrated.

Although training signal generator 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of training signal generator 400 may refer to one or more processes operating on one or more processing elements.

Figure 5:
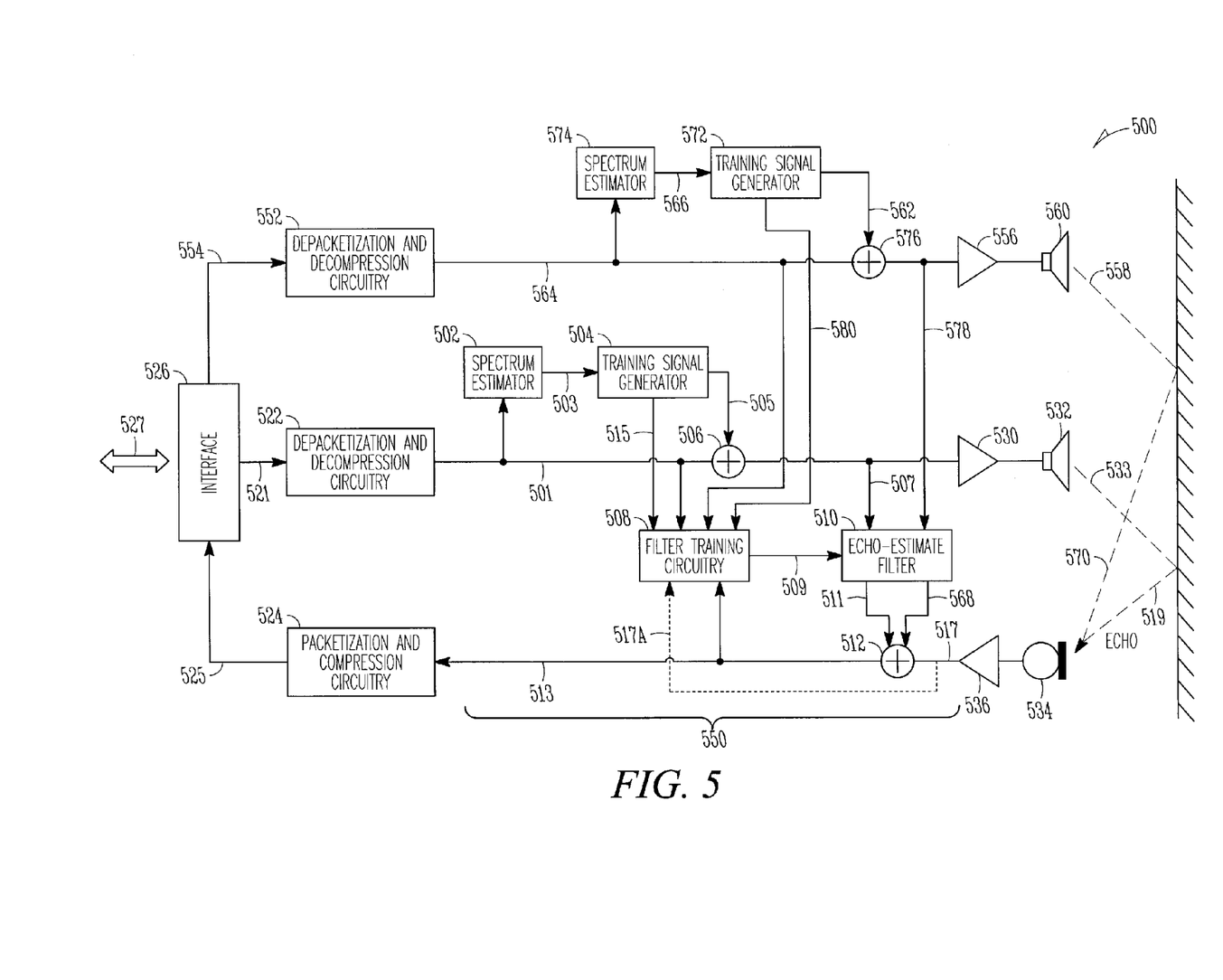
FIG. 5 is a functional block diagram of a multi channel audio communication device in accordance with some embodiments of the present invention.

FIG. 5 is a functional block diagram of a multi-channel audio communication device in accordance with some embodiments of the present invention. Multi-channel audio communication device 500 may be any audio communication device such as digital telephone, a wireless or wireline handset, a cellular or mobile telephone, a speaker phone, a cordless telephone, etc., that provides multi-channel audio communications. The multi-channel audio device may generate stereophonic and other multi-channel signals.

Multi-channel audio communication device 500 may include network interface 526 to transit and receive packetized communication signals 527 with a communication network. Multi-channel audio communication device 500 may also include depacketization and decompression circuitry 522 to depacketize and decompress packetized communication signals 521 received from interface 526, and DAC and audio amplification circuitry 530 to generate audio signals 533 with speaker 532. Multi-channel audio communication device 500 may also include microphone 534 and audio amplification and ADC circuitry 536 to provide return-path signals 517 and echo-reduction circuitry 550 to reduce echoes in return-path signals 517. The return path signals 517 comprise at least signals related to audio signal 558 and 533. Multi-channel audio communication device 500 may also include packetization and compression circuitry 524 to compress and packetize echo-removed signals 513 and provide packetized communication signals 525 to interface 526 for subsequent transmission. In some embodiments, interface 526 may provide an interface with an IP network, such as the internet, although the scope of the invention is not limited in this respect.

Multi-channel audio communication device 500 may include depacketization and decompression circuitry 552 to depacketize and decompress packetized communication signals 554 received from interface 526, and DAC and audio amplification circuitry 556 to generate audio signals 558 with speaker 560. The audio signals 558 may also be received by the microphone 534 and processed by the described technology downstream therefrom. Although the implementation illustrated in FIG. 5 shows one return path microphone 534, multiple return path microphones may also be used to accept multiple signals processed by the multi-channel audio communication device 500.

In some embodiments, packetization and compression circuitry 524 may compress and/or format digital audio information in accordance with a standard audio compression format, such as the MP3 format, although the scope of the invention is not limited in this respect as other audio compression formats may also be suitable. Similarly, depacketization and decompression circuitry 522 and 552 may decompress and/or de-format digital audio information received from interface 526 in accordance with a standard audio compression format.

In accordance with some embodiments of the present invention, echo-reduction circuitry 550 may generate training signals 505 for insertion into digital audio signals 501 at or below a noise floor. Training signals 505 may be generated from spectrum estimate 503 and a training sequence. Echo-reduction circuitry 550 may also generate echo-cancellation signal 511 for use in removing echo signals 519 from return-path signals 517. Echo-reduction circuitry 550 may also generate training signals 562 for insertion into digital audio signals 564 at or below a noise floor. Training signals 562 may be generated from spectrum estimate 566 and a training sequence. Echo-reduction circuitry 550 may also generate echo-cancellation signal 568 for use in removing echo signals 570 from return-path signals 517.

In some embodiments, echo-reduction circuitry 550 may include training signal generator 504 to generate training signals 505 for insertion into digital audio signals 501, filter training circuitry 508 to estimate filter coefficients 509 from the training sequence and return-path signals 517, and echo-estimate filter 510 to generate echo-cancellation signal 511. In these embodiments, through the use of a training sequence inserted into digital audio signals 501, echo signals 519 may be cancelled without having to evaluate an actual echo. One advantage is that the training sequence may allow the echo to be removed even when one or more users are speaking, which is difficult for many conventional echo-reduction systems.

In some embodiments, echo-reduction circuitry 550 may include training signal generator 572 to generate training signals 562 for insertion into digital audio signals 564, filter training circuitry 508 to estimate filter coefficients 509 from the training sequence and return-path signals 517, and echo-estimate filter 510 to generate echo-cancellation signal 568. In these embodiments, through the use of a training sequence inserted into digital audio signals 564, echo signals 570 may be cancelled without having to evaluate an actual echo. One advantage is that the training sequence may allow the echo to be removed even when one or more users are speaking, which is difficult for many conventional echo-reduction systems.

In some embodiments, echo-reduction circuitry 550 may also include spectral estimator 502 to generate spectrum estimate 503 from digital audio signals 501. In these embodiments, training signal generator 505 may generate a spectral mask from spectrum estimate 503 and may filter the training sequence based on the spectral mask to generate training signals 505. In these embodiments, training signal generator 505 may filter the training sequence so that each frequency component of the training sequence fits under the spectral mask. These embodiments are discussed in more detail below. Echo-reduction circuitry 550 may also include spectral estimator 574 to generate spectrum estimate 566 from digital audio signals 564. Training signal generator 572 may generate a spectral mask from spectrum estimate 566 and may filter the training sequence based on the spectral mask to generate training signals 562. In these embodiments, training signal generator 572 may filter the training sequence so that each frequency component of the training sequence fits under the spectral mask. These embodiments are discussed in more detail below.

In some embodiments, echo-reduction circuitry 550 may also include first summer 506 to combine training signals 505 with digital audio signals 501 to provide modified digital audio signals 507, and second summer 512 to subtract echo-cancellation signal 511 from return-path signals 517 to provide echo-removed signal 513. Echo-reduction circuitry 550 may also include third summer 576 to combine training signals 562 with digital audio signals 564 to provide modified digital audio signals 578. Second summer 512 may be used to subtract echo-cancellation signal 568 from return-path signals 517 to provide echo-removed signal 513.

Although echo-reduction circuitry 550 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of echo-reduction circuitry 550 may refer to one or more processes operating on one or more processing elements. In addition, although the return path of the multi-channel audio communication device 500 is illustrated with one signal line, two or more signal lines may be used to carry signals received by the microphone 534 and depending on the number of speakers implemented by the multi-channel audio communication device 500.

In some embodiments, training signal generators 504 and 572 may perform a discrete Fourier transform (DFT), such as a Fast Fourier Transform (FFT), on the training sequence to provide frequency components of the training sequence, and may scale the frequency components of the training sequence based on the spectral mask. In these embodiments, training signal generators 504 and 572 may also remove non-audible portions of the spectrum in the frequency domain. In these embodiments, training signal generators 504 and 572 may also perform an inverse DFT, such as an IFFT, on the scaled frequency components of the training sequence and the removed non-audible portions of signals from the spectrum to generate training signals 505 and 562, respectively. In these embodiments, training signal generators 504 and 572 may remove non-audible portions of the spectrum in the frequency domain prior to the IFFT.

Training signals 505 and 562, when combined with digital audio signals 501 and 564, respectively, may reduce and/or remove the non-audible portions while inserting the training sequence in the non-audible portions. The majority of the energy of the training sequence may reside in the non-audible portions of the spectrum and little or no energy may reside at or below a noise floor of the audible portions of the frequency spectrum. In this way users of audio communication device 500 may be unable to detect the presence of training signals 505 and 562.

In some embodiments, spectrum estimators 502 and 574 may generate spectrum estimates 503 and 566, respectively, by sampling digital audio signals 501 and 564 and performing a DFT, such as an FFT, on the sampled digital audio signals to provide estimates for each of a plurality of discrete frequency bins. In these embodiments, training signal generators 504 and 572 may use the estimates for each of the discrete frequency bins to generate respective spectral masks, such as the spectral mask 202 illustrated in FIG. 2. In these embodiments, these spectral masks may separate and/or divide the audible from the non-audible portions of the frequency spectrum. Training signal generators 504 and 572 may use the estimates for each of the discrete frequency bins to remove the non-audible portions from spectrum estimates 503 and 566, respectively.

Each set of samples of digital audio signals 501 and 564 may have a unique frequency spectrum. In these embodiments, spectrum estimator 502 and 574 may generate/update spectrum estimates 503 and 566, respectively, regularly, and test signal generators 504 and 572 may revise their respective spectrum masks based on the updated spectrum estimate, although the scope of the invention is not limited in this respect. In some embodiments, digital audio signals 501 and 564 may comprise 8-bit digital signals, while in other embodiments, digital audio signals 501 and 564 may comprise 16-bit digital signals, although the scope of the invention is not limited in this respect.

In some embodiments, filter training circuitry 508 may estimate filter coefficients 509 by performing a cross-correlation with the training sequence and return-path signals 517 to generate echo-filter taps based on an amplitude and a location of a correlation peak. Echo estimate filter 510 may adaptively apply the echo-filter taps to the modified digital audio signals 507 and 578 to generate the echo cancellation signal 511 and 568. In these embodiments, the echo-filter taps may correspond to filter coefficients 509.

In some embodiments, filter training circuitry 508 may perform a cross-correlation using return-path signals 517 after subtraction of echo-cancellation signals 511 and/or 568. Filter training circuitry 508 may perform the cross-correlation using echo-removed signal 513. In some alternate embodiments, filter training circuitry 508 may perform a cross-correlation using return-path signals 517 prior to subtraction of echo-cancellation signals 511 and/or 568. In these alternate embodiments, filter training circuitry 508 may perform the cross-correlation using return-path signals 517A rather than using echo-removed signal 513.

In some embodiments, filter training circuitry 508 may estimate filter coefficients 509 using the training sequence provided by training signal generators 504 and 572 using signal paths 515 and 580, respectively. In some embodiments, filter training circuitry 508 may also benefit from receiving digital audio signals 501 and/or 564 using statistics thereof when generating filter coefficients 509. In some alternate embodiments, filter training circuitry 508 may estimate filter coefficients 509 using training sequences present within training signals 505 and 562 provided by training signal generators 504 and 572, respectively. In these alternate embodiments, rather than estimating filter coefficients 509 using the training sequence directly provided by training signal generators 504 and 572, filter training circuitry 508 may estimate filter coefficients 509 using training signals 505 and 562.

According to at least one embodiment, the training signal generators 504 and 572 include some or all of the elements illustrated in FIG. 4.

In some embodiments, the training sequence may be a maximum-length (ML) pseudo-random noise (PN) sequence, although the scope of the invention is not limited in this respect as other types of sequences may also be suitable. In some embodiments, the training sequence may have one or more autocorrelation properties. In these embodiments, a correlation may produce a peak for time-delayed versions of the sequence with little or no correlation results otherwise.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. Echo-reduction circuitry comprising:
a plurality of training signal generators to generate training signals for insertion into digital audio signals at or below a noise floor and in a non-audible portion of a frequency spectrum, each generated training signal generated from a spectrum estimate and a training sequence, and wherein at least one of the plurality of training signal generators performs a transform operation on at least a portion of a frequency spectrum to generate a respective training signal;
filter training circuitry to estimate filter coefficients from a plurality of training sequences and return-path signals; and
an echo-estimate filter to generate echo-cancellation signals from the filter coefficients for use in removing echo signals from the return-path signals.

2. The echo-reduction circuitry of claim 1 further comprising a plurality of spectral estimators, each of the estimators to generate a spectrum estimate from digital audio signals,
wherein each of the training signal generators generates a spectral mask from a spectrum estimate and filters one of the plurality of training sequences based on the spectral mask to generate a training signal, and wherein each of the generated spectral masks has a frequency response to exclude non-audible portions of a frequency spectrum to allow the training signal to be inserted into digital audio signals at or below the noise floor within non-audible portions of the frequency spectrum.

3. The echo-reduction circuitry of claim 2 wherein each of the training signal generators:

performs a discrete Fourier transform (DFT) on a training sequence to provide frequency components of the training sequence;

scales frequency components of the training sequence based on a spectral mask;

removes non-audible portions of a frequency spectrum; and performs an inverse DFT on the scaled frequency components of the training sequence and the removed non-audible portions of signals from the frequency spectrum to generate a training signal.

4. The echo-reduction circuitry of claim 3 wherein each of the plurality of spectrum estimators generates a spectrum estimate from the digital audio signals by supplying the digital audio signals and performing a DFT on the sampled digital audio signals to provide estimates for each of a plurality of discrete frequency bins, wherein each of the training signal generators uses estimates for each of the discrete frequency bins to generate a spectral mask, the spectral mask separating audible from non-audible portions of a frequency spectrum, and wherein each of the training signal generators uses the estimates for each of the discrete frequency bins to remove the non-audible portions from the frequency spectrum.

5. The echo-reduction circuitry of claim 2 further comprising:

a first summer to combine training signals from a first of the plurality of training signal generators with digital audio signals to provide modified digital audio signals;

a second summer to combine training signal from a second of the plurality of training signal generators with digital audio signals to provide modified digital audio signals; and a third summer to subtract echo-cancellation signal from return-path signals to provide an echo-removed signal.

6. The echo-reduction circuitry of claim 5 wherein the filter training circuitry estimates filter coefficients by performing a cross-correlation with a training sequence and return-path signals to generate echo-filter taps based on an amplitude and a location of a correlation peak, and wherein the echo estimate filter adaptively applies the echo-filter taps to modified digital audio signals to generate echo-cancellation signals.

7. The echo-reduction circuitry of claim 6 wherein the filter training circuitry performs the cross-correlation using return-path signals after subtraction of one of the of the echo-cancellation signals.

8. The echo-reduction circuitry of claim 6 wherein the filter training circuitry estimates the filter coefficients using a training sequence provided by at least one of the plurality of training signal generator.

9. The echo-reduction circuitry of claim 6 wherein the filter training circuitry estimates the filter coefficients using a training sequence present within training signals provided by at least one of the plurality of training signal generator.

10. The echo-reduction circuitry of claim 6 wherein a training sequence is a maximum-length (ML) pseudo-random noise (PN) sequence.

11. The echo-reduction circuitry of claim 6 wherein echo-reduction circuitry is configured to reduce echoes in a multi-channel audio communication device, wherein modified digital audio signals are used to generate analog audio signals for transmission by a plurality of speakers of the multi-channel audio communication device, wherein at least one microphone of the multi-channel audio communication device is used to generate return-path signals, and wherein the multi-channel audio communication device comprises depacketization and decompression circuitry to depacketize and decompress packetized communication signals received from an interface to generate the digital audio signals, and packetization and compression circuitry to compress and packetize the echo-removed signals and provide packetized communication signals to the interface for subsequent transmission.

12. A method for reducing echoes in a full-duplex audio communication device comprising:

generating a plurality of training signals for insertion into digital audio signals at or below a noise floor and in a non-audible portion of a frequency spectrum, each of the training signals generated from a spectrum estimate and a training sequence, and wherein the generating performs a transform operation on at least a portion of a frequency spectrum to generate a respective training signal;

estimating filter coefficients from training sequences and return-path signals; and generating an echo-cancellation signals from the filter coefficients for use in removing echo signals from the return-path signals.

13. The method of claim 12 further comprising:

generating a plurality of spectrum estimates from the digital audio signals;

generating a spectral mask from each of the plurality of specimen estimates; and filtering each of the training sequences based on a spectral mask to generate the training signals, wherein each spectral mask has a frequency response to exclude non-audible portions of a frequency spectrum to allow a training signal to be inserted into digital audio signals at or below the noise floor within the non-audible portions of the frequency spectrum.

14. The method of claim 13 wherein generating the training signals comprises:

performing a discrete Fourier transform (DT) on a training sequence to provide frequency components of a training sequence;

scaling frequency components of a training sequence based on a spectral mask; removing non-audible portions of a frequency spectrum; and performing an inverse DFT on scaled frequency components of a training sequence and removed non-audible portions of a frequency spectrum to generate a training signal.

15. A multi-channel audio communication device comprising:

circuitry to generate digital audio signals; and echo-reduction circuitry to generate training signals for insertion into the digital audio signals at or below a noise floor and in a non-audible portion of a frequency spectrum, to estimate filter coefficients from training sequences and return-path signals, and to generate echo-cancellation signals from the filter coefficients for use in removing echo signals from the return-path signals,
wherein each of the training signals is generated from a spectrum estimate and a training sequence, and wherein at least one of the training signals is generated using a transform operation on at least a portion of a frequency spectrum.

16. The audio communication device of claim 15 wherein the echo-reduction circuitry comprises:
   a plurality of training signal generators, each of the plurality of training signal generators to generate a training signal;
   filter training circuitry to estimate the filter coefficients from training sequences and return-path signals;
   an echo-estimate filter to generate the echo-cancellation signals from filter coefficients for use in removing echo signals from the return-path signals; and
   a plurality of spectral estimators, each of the plurality of spectral generators to generate a spectrum estimate from the digital audio signals.

17. The audio communication device of claim 16 further comprising:
   digital-to-analog conversion (DAC) and audio amplification circuitry to generate audio signals with at least a plurality of speakers from modified digital audio signals;
   at least one microphone and audio amplification and ADC circuitry to provide return-path signals;
   a network interface to transmit and receive packetized communication signals with a communication network;
   depacketization and decompression circuitry to depacketize and decompress the packetized communication signals received from an interface to generate digital audio signals; and
   packetization and compression circuitry to compress and packetize echo-removed signals and provide packetized communication signals to the interface for subsequent transmission.

18. The audio communication device of claim 15, wherein the audio communication device is a speaker phone.

19. The audio communication device of claim 15, wherein the audio communication device is a wireless communication device.

* * * * *